Figure 1:
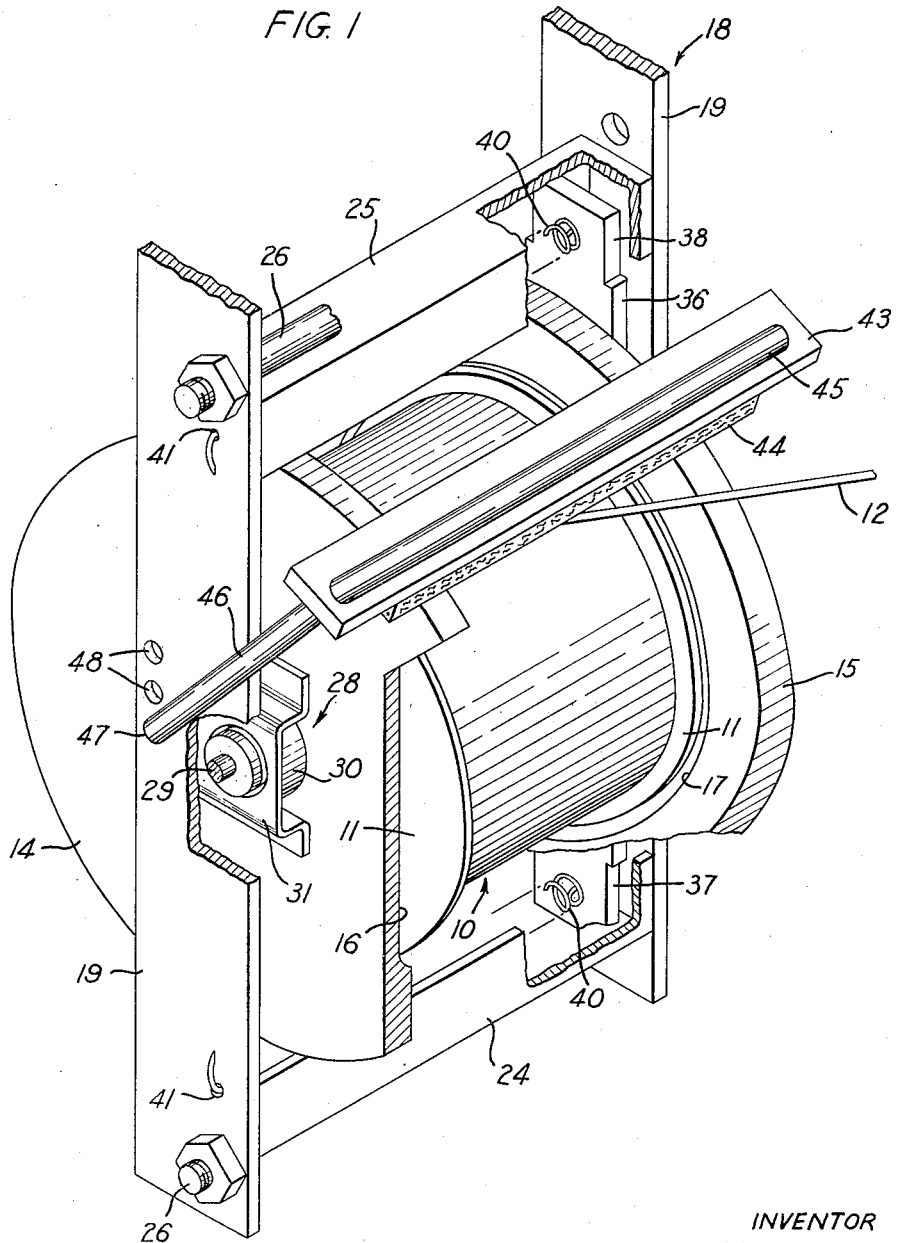

April 11, 1950 M. Z. RABINOW 2,504,046
REEL SUPPORT

Filed April 2, 1946 3 Sheets-Sheet 1

INVENTOR
M.Z. RABINOW
BY W.C. Parnell
ATTORNEY

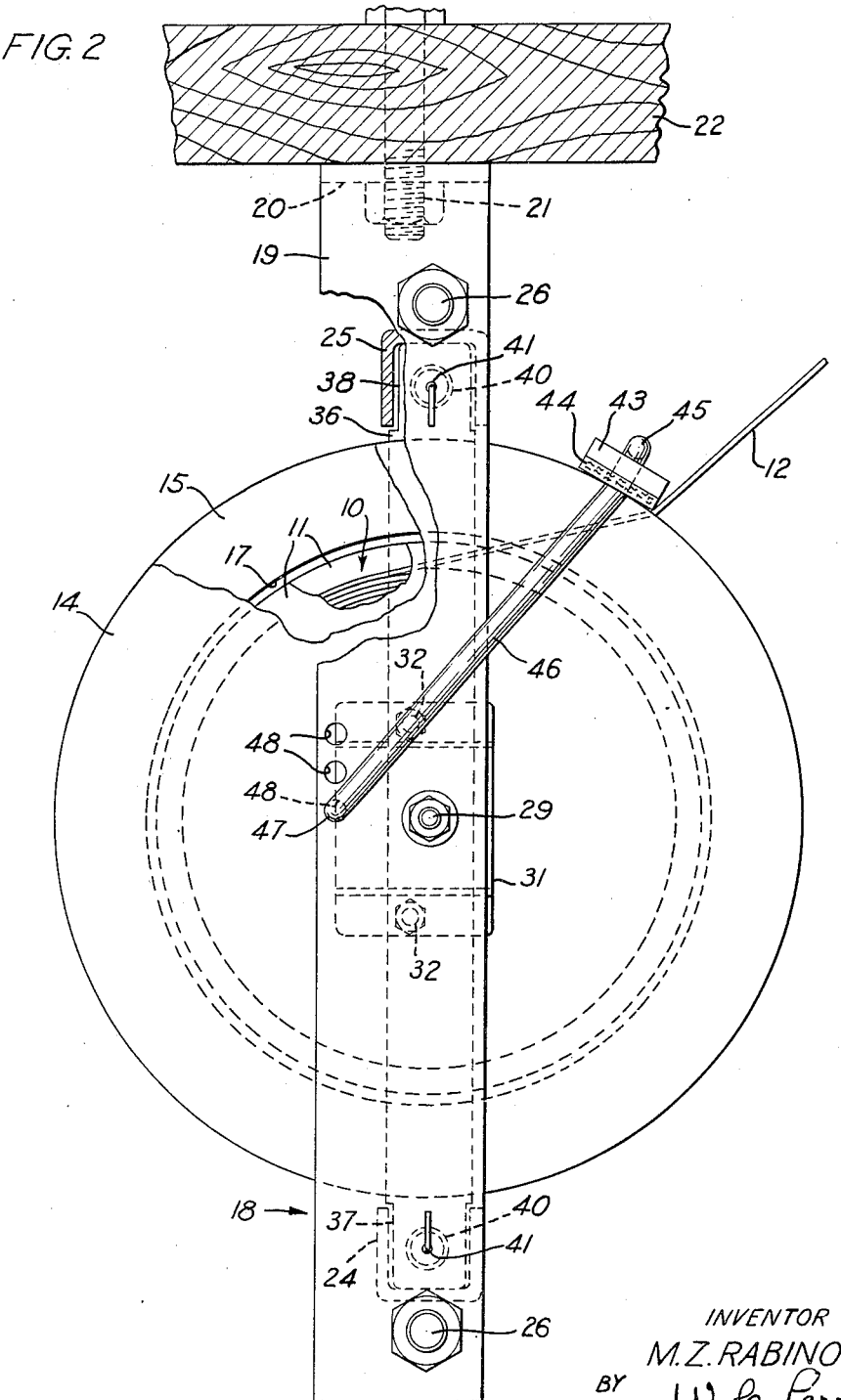

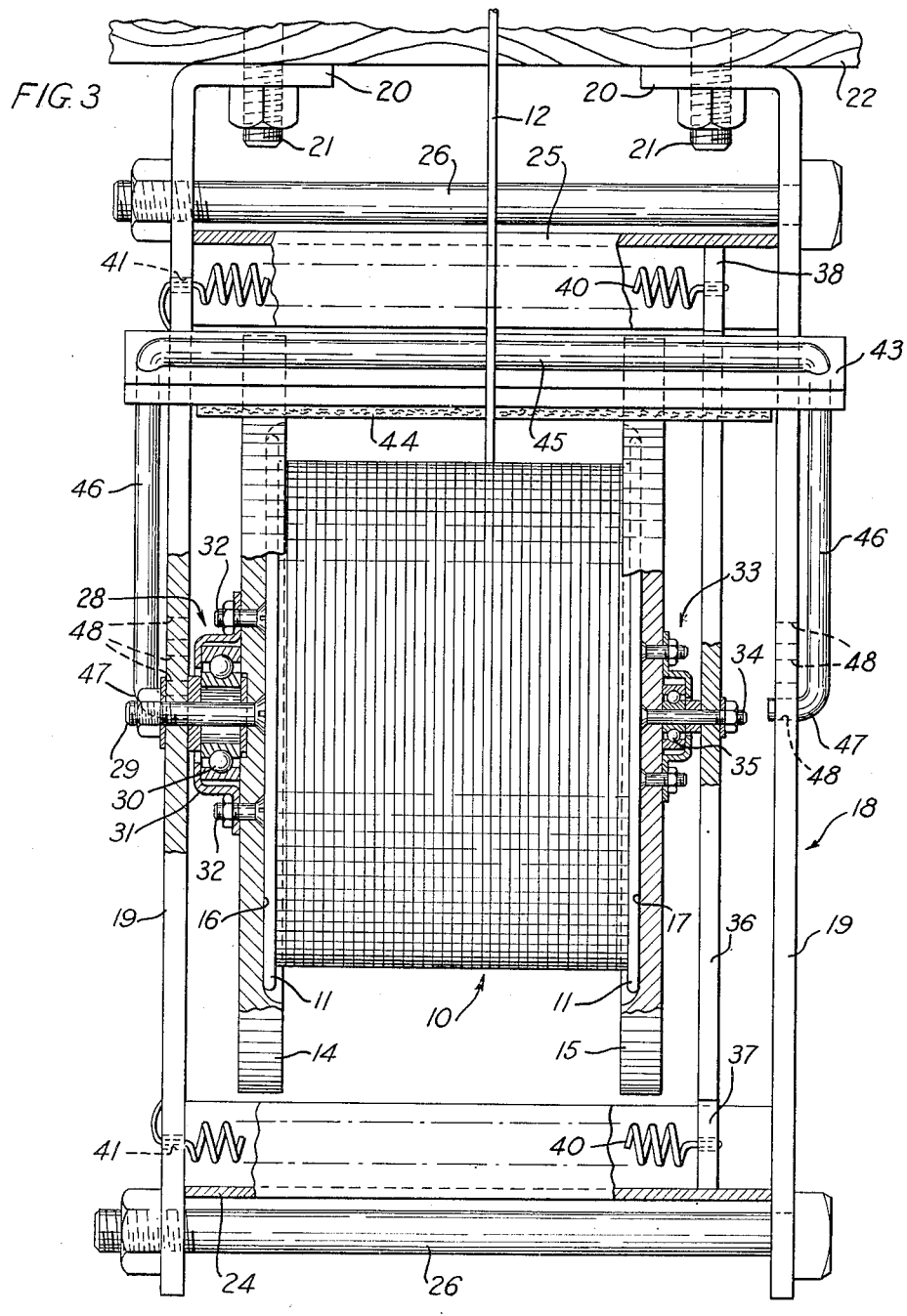

Patented Apr. 11, 1950

2,504,046

UNITED STATES PATENT OFFICE 2,504,046

REEL SUPPORT

Morris Z. Rabinow, Newark, N. J., assignor to Western Electric Company, Incorporated, New York, N. Y., a corporation of New York Application April 2, 1946, Serial No. 659,017

3 Claims. (Cl. 242—134)

This invention relates to reel supporting fixtures, and more particularly to fixtures for supporting strand or cable supply reels.

In the manufacture of certain types of cables for use in the communication arts numerous supply reels containing the electrical conductors with insulations of various color or code combinations must be readily accessible to persons forming the cables. It has been found that the work in forming such cables can be greatly facilitated by supporting the supply reels for rotation so that desired quantities of conductors may be readily removed from the reel.

An object of the invention is to provide a fixture capable of readily receiving, supporting, and centering the strand supply reel for rotation for the removal of strand material from the reel.

The fixture in this embodiment of the invention is particularly designed for supply reels of insulated conductors for use in forming switchboard cables. A pair of disks have their inner faces recessed to receive the heads of a supply reel, one of the disks being rotatably supported by a fixed position bearing unit. The other disk is rotatably supported by a similar bearing unit axially aligned with the first bearing unit and mounted upon a member, the ends of which ride in channels of a supporting frame structure and are normally urged by springs to urge the movable disk toward the fixed position disk to firmly support the supply reel therebetween. A brake element, which extends across the peripheries of the disks, is pivotally supported by the supporting frame to rest upon the disks, normally holding them against rotation but movable free of the disks by the strand material being pulled from the reel.

Other objects and advantages will be apparent from the following detailed description when considered in conjunction with the accompanying drawings wherein Fig. 1 is a perspective view of the fixture, portions thereof being broken away;

Fig. 2 is a side elevational view of the fixture, portions thereof being broken away; and Fig. 3 is a front elevational view of the fixture, portions thereof being shown in section.

Referring now to the drawings, attention is first directed to the reel 10 having heads 11 and filled with a supply of strand material 12, which, in the present instance, is an insulated electrical conductor. The fixture includes disks 14 and 15 which are substantially identical in structure, recesses 16 and 17 being formed in their inner surfaces to completely receive the heads 11 of the reel and to center the heads of the reel with the common center line of the disks.

A main frame indicated generally at 18 is composed of vertical members 19 with bent upper ends 20 apertured to receive mounting bolts 21 for mounting the frame to a suitable support 22. Channel members 24 and 25 are disposed laterally between the vertical members 19, and, if desired, the ends of the channel members may be welded to the vertical members. Connecting bolts 26 extend through apertures and the vertical members 19 adjacent their respective channel members 24 and 25 to complete the structure of the main frame.

A bearing unit indicated generally at 28 serves to connect the disk 14 at a fixed position on the adjacent vertical member for rotation about the axis of the unit. The unit includes a bolt 29 extending through the disk 14, through the center of a bearing 30, and through the adjacent vertical member 19. A housing 31 for the bearing 30 is secured at 32 to the disk 14.

A similarly housed bearing unit 33 is provided for the disk 15, the bolt 34 of this unit extending through the disk 15, the bearing 35, and a supporting element 36. The element 36 is parallel with the adjacent vertical member 19 of the frame and has its ends reduced at 37 and 38 so that they will be slideable in their respective channels 24 and 25. The channels, in addition to supporting the element 36, its bearing unit 33 and disk 15, hold the element 36 against rotation but free for lateral movement toward and away from the disk 14. The element 36 is normally urged toward the disk 14 by springs 40, the righthand ends being connected in any suitable manner to the adjacent ends of the elements, their opposite ends extending through apertures 41 in the vertical member 19 adjacent the disk 14.

A brake element 43, carrying a brake pad 44, extends laterally of the disks so that the pad 44 will normally rest on the peripheries of the disks 14 and 15. A substantially U-shaped bracket 45 has its legs 46 extending through apertures in the ends of the brake element 43, the extreme ends of the legs being bent inwardly at 47 and receivable in any desired one of the plurality of sets of apertures 48 in the vertical members 19.

In the present illustration the filled supply reel 10 is supported by the disks 14 and 15 and is normally held against rotation by the braking element 43. When the strand is tensioned in pulling a desired length from the reel, the pad is lifted out of contact with the disks to permit free rotation, but as soon as the tension is relieved, as by cutting off the desired length of strand, the pad returns to its braking position to prevent further unwinding of the strand. It will be noted that the recesses 16 and 17 in the disks are formed to completely receive the reel heads serving not only as the positive support for the reel but to center the reel with the axis of rotation of the disks. Furthermore, the bearing units, including particularly their housings or cover members, contain sufficient play so that the disks may find their aligned connections with the head of the reel. In other words, the units 28 and 33 are slightly movable or wobbleable with respect to their true centers so that the inner faces of the recesses 16 and 17 may lie flush with the outer faces of the heads of the reel.

When the reel 10 becomes empty, it may be readily removed by the operator moving the element 33 to the right, Fig. 3, sufficiently to free the reel from between the disks and, in a similar manner, the disks can be spaced to receive a filled reel.

Although specific improvements of the invention have been shown and described, it will be understood that they are but illustrative and that various modifications may be made therein without departing from the scope and spirit of this invention as defined by the appended claims.

What is claimed is:

1. A fixture for rotatably supporting a strand supply reel comprising disks formed to support the heads of a strand supply reel, fixed position means to support one of the disks for rotation, means mounted for movement toward and away from the last named means to rotatably support the other disk, means to normally urge the movable supporting means with its disk toward the other disk to support the reel for rotation between the disks, and a brake element mounted to rest on the peripheries of the disks to normally hold them and the reel against rotation and movable free of the disks by a strand being pulled from the reel to move the element free of the disks.

2. A fixture for rotatably supporting a strand supply reel comprising disks formed to support the heads of a strand supply reel, a unit to wobbleably but not displaceably support one of the disks for rotation, means mounted for movement toward and away from the unit to rotatably support the other disk, and means to normally urge the movable supporting means with its disk toward the other disk to support the reel for rotation between the disks.

3. A fixture for rotatably supporting a strand supply reel comprising a frame including spaced supports connected by spaced channel members, a bearing member mounted on one of the supports, a supporting member having its ends disposed in the channel members, held against rotation thereby but movable toward and away from the bearing member, another bearing member mounted on the supporting member in central alignment with the first bearing member, disks, having recesses in their inner faces to receive, center and support heads of a strand supply reel, mounted centrally on their respective bearing members, springs disposed in the channel members and connected to the supporting member to normally urge the supporting member with its bearing member and disk to cause the reel to be firmly held by the disks, a brake element extending across the peripheries of the disks to normally hold them and the reel against rotation, and means to pivotally support the element for movement free of the disks by a strand pulled from the reel to free the disks and reel for rotation.

MORRIS Z. RABINOW.

REFERENCES CITED

The following references are of record in the file of this patent:

UNITED STATES PATENTS

| Number | Name | Date |
|---|---|---|
| Re. 21,995 | Mueller | Jan. 6, 1942 |
| 71,291 | Fewkes | Nov. 26, 1867 |
| 865,664 | Votey | Sept. 10, 1907 |
| 1,196,740 | Palmer | Aug. 29, 1916 |
| 1,684,951 | Dowdall | Sept. 18, 1928 |
| 2,213,764 | Hermann | Sept. 3, 1940 |

FOREIGN PATENTS

| Number | Country | Date |
|---|---|---|
| 192,114 | Germany | Dec. 13, 1907 |
| 539,545 | Germany | Nov. 27, 1931 |